March 31, 1959     H. C. WOHLFERTH ET AL     2,880,336
COMMUTATOR CONE
Filed April 9, 1957
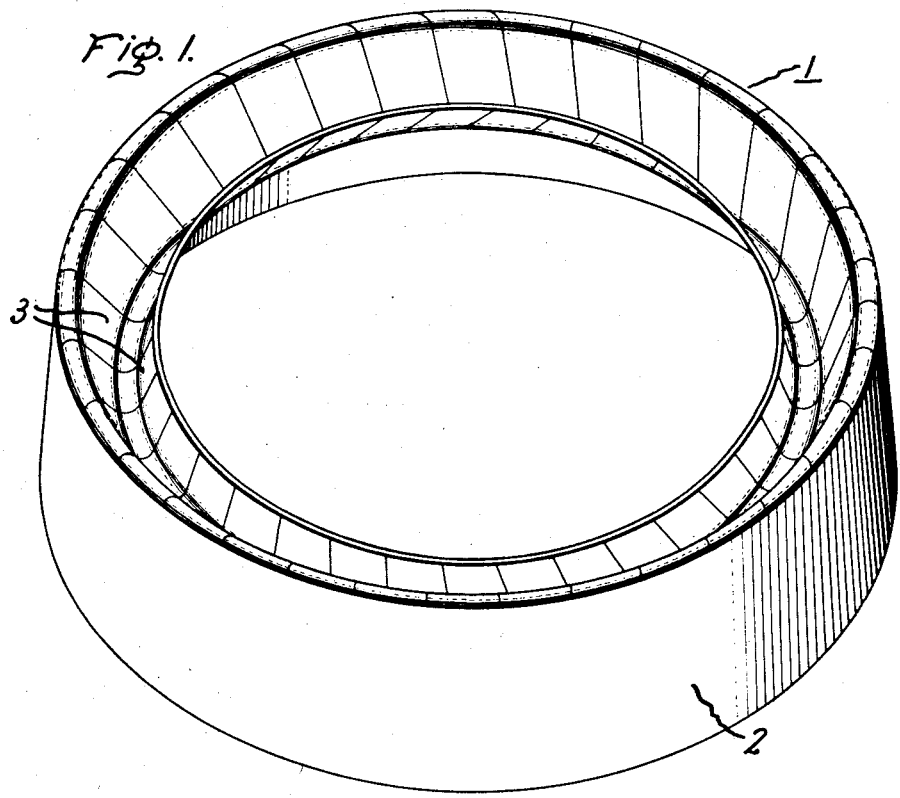
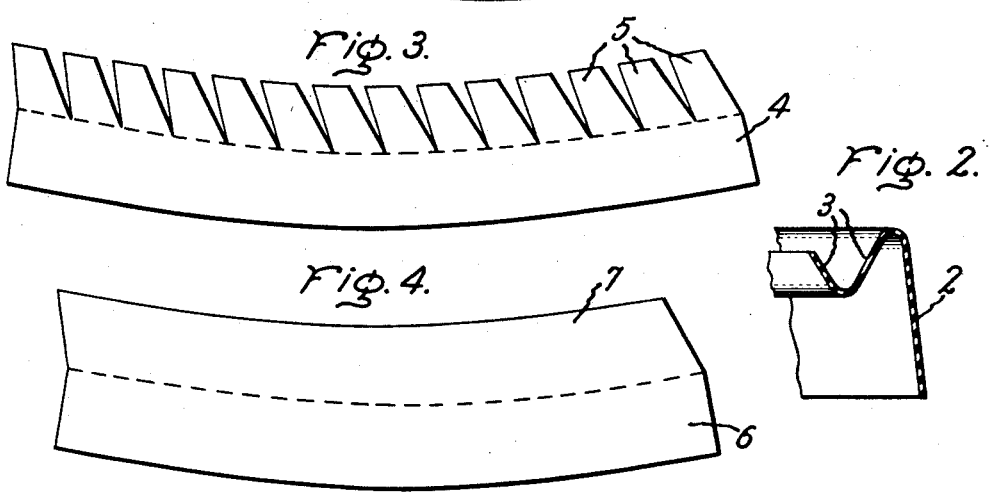
Inventors:
Harry C. Wohlferth,
Reginald J. Martin,
by
Their Attorney.

United States Patent Office 2,880,336
Patented Mar. 31, 1959

2,880,336

COMMUTATOR CONE

Harry C. Wohlferth and Reginald J. Martin, Schenectady, N.Y., assignors to General Electric Company, a corporation of New York Application April 9, 1957, Serial No. 651,613

5 Claims. (Cl. 310—236)

This invention relates to a commutator cone for use in electrical motors and to a process for preparing said cone.

Heretofore commutator cones have generally been composed of a plurality of layers of mica, manufactured by pressing laminates from a plurality of varnish-coated mica layers. It is important that these commutator cones possess uniform physical and dielectric properties. For this reason it is necessary to avoid so-called "resin pockets" or portions of the laminate which are relatively high in resin content in comparison to other portions of the laminate. Mica, itself, has relatively little resilience. In an effort to achieve this uniformity in distribution of mica and varnish, the laminating procedure is generally carried out between a steel plate on one side and a cushioned (generally paper) plate on the other side. This cushion adds resiliency to the pressing operation and avoids, to a certain extent, valleys and bridges in the mica laminate. Following the laminating procedure, these mica laminates are generally sanded to produce an even surface. The irregularity or unevenness of the surface results from the use of the cushion on one of the laminating plates. This sanding removes about 20% of the laminate.

In spite of the above efforts aimed at achieving uniformity in the laminate from which the commutator cone is formed, the present known commutator cones still possess a relatively high degree of uneven density. As a result, the commutator segments, which are held in place by the commutator cones, become embedded in the commutator cones in those portions where the resin content is high. These commutator segments thereby become displaced and the commutator is thrown off balance as it rotates. This results in considerable brush wear and, moreover, may result in a breakdown of the dielectric due to crushing of the mica. Moreover, the removal by sanding of a considerable portion of the laminate is wasteful.

It is an object of this invention to provide a commutator cone of greatly improved uniformity in both electrical and physical properties.

It is an additional object of this invention to provide a commutator cone which has greater resiliency, thereby avoiding uneven densities resulting from the prior lack of resiliency during the laminating operation.

It is an additional object of this invention to achieve the above objects while at the same time avoiding the necessity of removal, by sanding, of portions of the laminate.

The foregoing and other objects of this invention are accomplished by the provision of an integral laminate, itself comprising a plurality of individual laminates comprising an inner asbestos layer and two outer micaceous layers, the layers and the individual laminates being bonded together with a resin to form a unitary laminate. The inner layer of asbestos has been found not only to provide the necessary resiliency for the laminating operation but, quite unexpectedly, has been found to result in a superior finished commutator cone. With conventional commutator cones, 1/16" thick, dielectric failure at 9,000 volts occurs in about 10% of the samples tested. Ninety-five percent of the cones of the present invention, of equivalent thickness, have been found to withstand twice this voltage, or 18,000 volts, without dielectric failure. The commutator cones of this invention are uniform in thickness before and after baking. They do not slip or delaminate during processing and result in smooth commutators in spin. Because of the resiliency of the cones and the resultant avoidance of the necessity of sanding off uneven surfaces, the cones of this invention will effect a considerable cost reduction.

In general, the process of this invention involves the coating of a layer of flake mica with a suitable varnish, subsequently laying a layer of varnish impregnated asbestos on the varnish-coated mica. Finally, a third layer of varnish-coated mica is layed upon the two mica-asbestos layers. This mica-asbestos-mica build-up is then pressed into a laminate. There is no necessity in the pressing operation to use a resilient layer, e.g. paper, to make a uniform density laminate. The result is that the heretofore conventional procedure of sanding off the surface of the laminate to produce even, parallel surfaces is no longer necessary. The asbestos layer serves not only to give resiliency to the laminating process, but also serves to produce a laminate with superior properties.

In effect, the asbestos acts to put a solid filler material into the voids of the micaceous layer. The asbestos, being highly resilient, acts as a cushion for the laminate, and tends to prevent the break-up of mica, the latter giving the essential electrical properties to the finished commutator cone. The result is a laminate of more uniform density and of generally superior electrical properties.

Our invention will be more clearly understood from the following description taken in connection with the accompanying drawing, in which:

Fig. 1 is a perspective view of one form of a commutator cone made in accordance with the present invention.

Fig. 2 is a perspective view of a fragmentary portion of the commutator cone shown in Fig. 1.

Fig. 3 is a side elevation of an individual laminate made in accordance with one embodiment of this invention, suitably cut, but not yet molded into the final form shown in Fig. 1.

Fig. 4 is a side elevation of an individual laminate made in accordance with another embodiment of this invention, suitably cut, but not yet molded into final form.

Fig. 5 is an end view of an individual laminate made in accordance with this invention.

The commutator cone 1 comprises an outer annular skirt 2 integral with inner substantially V-shaped ring 3. In manufacturing cone 1, there are first produced individual mica-asbestos-mica laminates. An end view of one such three-ply individual laminates is shown in Fig. 5. These individual laminates may then be suitably cut as is shown in Fig. 3. Skirt 4 forms the outer portion of the cone and fingers 5 form the inner V-shaped ring 3 of the cone shown in Fig. 1. Several of these individual cut laminates, preferably three, but any number in excess of one, are stacked one on top of the other, preformed and then placed into a mold where they are molded into their final configuration.

Another method of forming the commutator cones consists of forming the cones from a plurality of segments. One of such segments is shown in Fig. 4. In Fig. 4, the lower portion 6 forms the outer skirt of the cone and the V-shaped ring is formed from upper portion 7 of the segment. A plurality of these segments may then be stacked in staggered relationship to each other and molded into a commutator cone. The difference between the laminate of Fig. 3 and the laminate of Fig. 4 resides in the fact that the length of the laminate of Fig. 3 is approximately equivalent to the circumference of the cone, whereas the length of the laminate of Fig. 4 represents only a fractional part of the circumference.

The following example is given my way of illustration and not by way of limitation. All parts are by weight.

*Example 1*

The laminate of this example was prepared from muscovite mica splittings and ferrous asbestos paper. A minimum of 80% of the mica splittings had a size of at least ¾ square inch and a maximum of 5% of the splittings were capable of passing through a ⅝ inch square opening screen. The ferrous asbestos paper had a thickness of 0.010 inch, a maximum weight of 4.6 lbs. per 100 sq. ft., and a chemical composition of at least 80% asbestos content and a maximum of 6% magnetic iron content. A layer of the asbestos paper was coated with a varnish containing a resin produced by reacting endomethylene tetrahydrophthalic anhydride and a polyhydric alcohol blended with polyvinyl acetate and having a resin solids content of 14 to 17 parts. The solvent was a mixture of ethyl alcohol and toluol. A 325 gram 27" by 38" layer of muscovite mica splittings impregnated with the foregoing varnish was then laid on the top of the coated surface of asbestos. This build-up was dried 5 minutes at 140° C. The two layer build-up was then turned over and the reverse side of the asbestos coated with another layer of the same varnish. To this side of the coated layer of asbestos was added a second layer 27" by 38" of 325 grams of mica, impregnated as above. The three-ply laminate was then placed in a laminating press between sheets of polytetrafluoroethylene to prevent sticking, and formed into an individual laminate under heat and pressure. The temperature of the platens of the press was from about 165 to 175° C. The pressure was 500 p.s.i. and the laminate was maintained in the laminating press for approximately 15 minutes. There was no resilient paper surface placed upon one of the plates of the press. The absence of such a resilient layer thus avoided the necessity of sanding the surface of the laminate.

The laminated sheet stock at this point was still in a moldable flat condition. These sheets were then cut into appropriate patterns and three layers of individual laminates were placed in slightly off-set relation one on top of the other, giving a total ply of nine layers.

The three individual laminates were then heated and placed in a preforming fixture, conforming approximately to the shape of the finished commutator cone. The preforms were cooled and then placed into a mold and molded into the final formed article. The total pressure used for this last molding operation was 70 tons, the temperature was from 170 to 185° C. and the curing time was approximately one hour.

The resinous materials which may be used for bonding the laminates of this invention may be those varnishes conventionally used in forming commutator cones of mica splittings. It should be emphasized, however, that the resin must be one which is capable of being both preformed and postformed or cured in the final molding operation. Perhaps the most common resins used for this purpose are either shellac or an alkyd resin. A particularly preferred type of resinous material useful in the present invention is a blend or heat-reacted mixture of a polymerizable ethylenically unsaturated monomer and an unsaturated alkyd resin. These resinous materials are more fully described in U.S. Patents 2,319,780 and 2,319,826 to Pellett, assigned to the assignee of the present invention. U.S. Patent 2,319,780 describes an electrical insulating composition for bonding mica flakes comprising an alkyd resin and a polyvinyl ester. U.S. Patent 2,319,826 describes the reaction product of endomethylene tetrahydrophthalic anhydride and a polyhydric alcohol blended with a polyvinyl acetate. However, in addition to the foregoing, other resinous materials may be used including straight alkyd resins, oil modified alkyd resins, epoxy resins, polyurethanes, silicones and mixtures of the foregoing resinous materials.

The asbestos paper useful in the practice of this invention may be any paper containing a substantial portion of asbestos, such as a paper containing asbestos and bentonite, the only requirement being that the paper be composed largely of asbestos and have a high degree of resiliency. Both acid washed or nonferrous asbestos and ferrous asbestos may be used in the practice of this invention. However, the ferrous asbestos (which has not been acid washed) has been found to be as good as the acid washed asbestos and is, of course, more economical.

If desired, the V-ring portion of the cone may be formed separately from the outer skirt. The V-ring is the mechanically important portion of the cone and thus forms the critical portion of the integral laminate.

If it is necessary to store the commutator cones of this invention over a long period of time, it has been found that moisture contamination or moisture absorption may be prevented by the simple expedient of coating the finished commutator cone with a coating of a suitable varnish. Such a coating or moisture barrier may be composed of conventional moisture-resistant resinous or varnish solutions such as shellac, carnauba wax, polyvinyl chloride acetate varnish, spar varnish, methyl polysiloxane etc. The varnish may be applied by any suitable method such as brush coating and cured with heat or by air drying.

The commutator cones of this invention may be used in any type of electrical motor. However, they are particularly adapted for use in the greater stress requirements of traction motors used in locomotives.

What we claim as new and desire to secure by Letters Patent of the United States is:

1. A commutator cone comprising a substantially V-shaped integral molded laminate, said integral laminate comprising a plurality of individual laminates each of which is offset from the other individual laminates, each of said individual laminates comprising an inner asbestos layer and two outer micaceous layers, said layers being bonded together with a resin to form individual laminates and said individual laminates being bonded together at an elevated temperature and pressure with a heat-curable resin to form a single integral laminate.

2. A commutator cone comprising an integral molded laminate having an outer annular skirt and an inner substantially V-shaped ring, said integral laminate comprising a plurality of individual laminates each of which is offset from the other individual laminates, each of said individual laminates comprising an inner asbestos layer and two outer micaceous layers, said layers being bonded together with a resin to form individual laminates and said individual laminates being bonded together at an elevated temperature and pressure with a heat-curable resin to form a single integral laminate.

3. A commutator cone for locomotive traction motors comprising an integral molded laminate having an outer annular skirt and an inner substantailly V-shaped ring, said integral laminate comprising three individual laminates each of which is offset from the other individual laminates, each of said individual laminates comprising an inner asbestos layer and two outer micaceous layers formed from mica splittings, said layers being bonded together with an alkyd resin to form individual laminates and said individual laminates being bonded together at an elevated temperature and pressure with a heat-curable resin to form a single integral laminate.

4. A process for producing a commutator cone comprising bonding together with a resin an inner asbestos layer and two outer micaceous layers to form a plurality of individual laminates, superimposing said individual laminates so that each individual laminate is offset from the other individual laminates, molding together at an elevated temperature and pressure with a heat-curable resin said individual laminates to form a single integral laminate, said integral laminate being a substantially V-shaped ring.

5. A process for producing a commutator cone comprising bonding together with an alkyd resin an inner layer of asbestos and two outer micaceous layers formed from mica splittings to form three individual laminates, superimposing said individual laminates so that each individual laminate is offset from the other individual laminates, preforming said individual laminates into an integral laminate having an outer annular skirt and an inner substantially V-shaped ring and molding at an elevated temperature and pressure with a heat-curable resin said integral laminate into a commutator cone.

References Cited in the file of this patent

UNITED STATES PATENTS

| 1,857,586 | Coffey | May 10, 1932 |
| 2,277,590 | Howard | Mar. 24, 1942 |
| 2,528,235 | Loritsch | Oct. 21, 1950 |

FOREIGN PATENTS

| 337,229 | Great Britain | Oct. 30, 1930 |